United States Patent Office 3,660,467
Patented May 2, 1972

3,660,467
AROMATIC ESTERS OF ALIPHATIC
DICARBOXYLIC ACIDS
Patrick Gould, Woodham, near Weybridge, John Henry Alexander Row, Rochester, Kent, and Stanley George Rudston, West Molesey, England, assignors to The British Petroleum Company Limited
No Drawing. Continuation of application Ser. No. 382,964, July 15, 1964. This application Oct. 2, 1969, Ser. No. 866,077
Int. Cl. C07c 69/34
U.S. Cl. 260—479 S 10 Claims

ABSTRACT OF THE DISCLOSURE

Phenoxy phenyl esters of carboxylic acids are provided which are employed as synthetic lubricants and heat transfer fluids and have the following general formula:

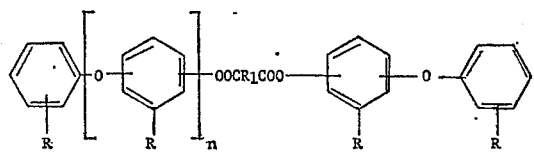

wherein:

R is a member selected from the group consisting of hydrogen atoms and alkyl groups having from 1–4 carbon atoms, $R_1$ is a saturated divalent hydrocarbon group having from 2–14 carbon atoms, and n is 0 or 1.

Furthermore, three methods of preparing the above esters are provided. The first method comprises a conventional esterification reaction of a phenolic reactant with one or more acids. The second method reacts the phenolic reactant or an alkali metal salt thereof with an acid halide. The third and last method trans-esterifies the phenolic reactant with a dimethyl ester.

This application is a continuation of application Ser. No. 382,964, filed July 15, 1964 and now abandoned.

This invention relates to novel aromatic esters of saturated aliphatic dicarboxylic acids having utility as lubricants or heat transfer fluids.

The said novel esters are those of the general formula:

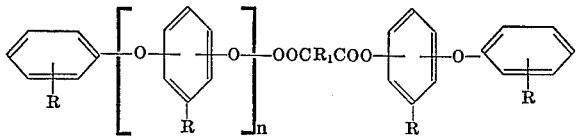

wherein:

the R's (which may be the same or different) are hydrogen atoms or alkyl groups having 1–4 carbon atoms,
$R_1$ is a saturated divalent hydrocarbon group, e.g. a polymethylene group, having 2–14, preferably 7–14, carbon atoms, and
n is 0 or 1.

Two types of preferred novel esters are those of the general formula:

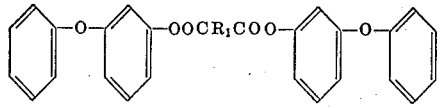

and those of the general formula:

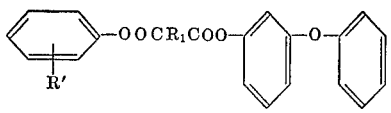

where $R_1$ is specified above and R' is a hydrogen atom or tertiary butyl radical.

The invention includes ester products consisting of, or containing a major proportion of, one or more esters as defined above.

The invention also includes three methods of preparing ester products having utility as lubricants or heat transfer fluids. All three methods utilise a phenolic reactant (or specified derivative thereof) which consists of:

(a) 50–100% molar of one or more phenols of the formula $HOC_6H_3(R)OC_6H_4R$, e.g. m-phenoxyphenol, and (b) 0–50% molar of one or more phenols of the formula $HOC_6H_4R$, e.g. tertiary butyl phenols wherein the R's are hydrogen atoms or alkyl groups having 1–4 carbon atoms.

According to method 1 the phenolic reactant is esterified with one or more acids of the formula

$HOOCR_1COOH$

The esterification reaction may be carried out in conventional manner using a refluxing solvent, e.g. toluene or xylene, and an esterification catalyst, e.g. p-toluene sulphonic acid.

According to method 2 the phenolic reactant, or alkali metal salt thereof, is reacted with one or more acid halides of the formula: $XOCR_1COX$, where X is a halogen atom, preferably chlorine or bromine.

According to method 3 the phenolic reactant is transesterified with a dimethyl ester of the formula

$CH_3OOCR_1COOCH_3$ (In the last three paragraphs $R_1$ has the meaning previously assigned.)

The invention also includes products prepared by the above reactions. It will be appreciated that where a mixture of phenols is reacted with a mixture of acids the product will be a mixture which probably contains all the possible combinations of the reactants. Thus, when the phenolic reactant contains phenols of the formula $HOC_6H_4R$, the product will contain some molecules which do not have the formula given above. The product will, however, be a mixture which contains a major proportion of these esters.

By way of example the preparation of several esters according to the invention will now be described.

Ester A: Di-m-phenoxyphenyl azelate

Azelaic acid (9.91 g., 0.05 mole; formula

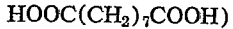
$HOOC(CH_2)_7COOH)$ m-phenoxyphenol (18.6 g., 0.1 mole) and p-toluenesulphonic acid (1 g.) were dissolved in m-xylene (70 ml.) and the mixture heated under reflux for 24 hours in a flask fitted with a trap to collect the water evolved during the reaction. The solution in xylene was diluted with benzene (50 ml.) and extracted five times with aqueous sodium hydroxide (10 percent v./v., 50 ml.) and then washed three times with water (50 ml.). The solution was dried with anhydrous magnesium sulphate and heated under reflux with animal charcoal (1 g.) for 1 hour before being evaporated, at reduced pressure, to small bulk to give a red oil (20.3 g., 77 percent yield).

Ester B: Mixed esters of azelaic acid with phenol and m-phenoxyphenol

To azelayl chloride (11.3 g., 0.05 mole; formula $$ClOC(CH_2)_7COCl$$

was added, with stirring, a solution in benzene (50 ml.) of phenol (4.94 g., 0.05 mole) and m-phenoxyphenol (9.78 g., 0.05 mole). Pyridine (8.9 ml., 0.11 mole) was slowly added to the above stirred solution and the mixture heated under reflux for 1 hour. The mixture was then extracted three times with dilute hydrochloric acid (50 ml.), three times with aqueous sodium hydroxide (10 percent w./v., 50 ml.) and washed twice with water (50 ml.). After drying with anhydrous potassium carbonate, the solution was evaporated, at reduced pressure, to small bulk to give a pale yellow oil (19.4 g., 90 percent yield).

Ester C: Di-m-phenoxyphenyl sebacate

This was prepared in the same manner as Ester A except that sebacic acid (10.1 g., 0.05 mole;

$$HOOC(CH_2)_8COOH)$$

was used instead of azelaic acid.

Ester D: Di-m-phenoxyphenyl brassylate

This was prepared in the same manner as Ester A except that brassylic acid (12.2 g., 0.05 mole; formula $HOOC(CH_2)_{11}COOH$) was used instead of the azelaic acid.

Ester E: Di-m-phenoxyphenyl thapsate

This was prepared in the same manner as Ester A except that thapsic acid (14.3 g., 0.05 mole; formula $HOOC(CH_2)_{14}COOH$) was used instead of the azelaic acid.

Ester F: Di-m-phenoxyphenyl glutarate

This was prepared in the same manner as Ester A except that glutaric acid (6.6 g., 0.05 mole; formula $HOOC(CH_2)_3COOH$) was used instead of the azelaic acid.

Ester G: Di-m-phenoxyphenyl alphamethylglutarate

This was prepared in the same manner as Ester A except that alphamethylglutaric acid (8.8 g., 0.05 mole; formula $HOOCCH(CH_3)CH_2CH_2COOH$) was used instead of the azelaic acid.

Ester H: Di-m-phenoxyphenyl dimethylmalonate m-Phenoxyphenol (31.0 g., 0.167 mole), potassium hydroxide (9.35 g., 0.167 mole) and toluene (100 ml.) were heated and stirred vigorously beneath a Dean-Stark trap until water ceased to collect in the trap. At this time there were 3.4 ml. of water in the trap.

The toluene suspension of the potassium salt obtained was heated under reflux with dimethylmalonyl chloride (16.9 g., 0.10 mole) for 16 hours. The crude product was taken into ether and washed first with 2% aqueous sodium hydroxide and then with water.

Distillation of the dried ethereal solution gave di-m-phenoxyphenyldimethylmalonate as a pale yellow oil.

Ester I: Mixed esters of azelaic acid with o-tertiary butyl phenol, m-tertiary butyl phenol and m-phenoxyphenol This was prepared in a similar manner to Ester B except that reactants were azelayl chloride (11.3 g., 0.05 mole), o-tertiary butyl phenol (5.3 g., 0.35 mole), m-tertiary butyl phenol (5.3 g., 0.035 mole) and m-phenoxyphenol (6.5 g., 0.035 mole).

Some analytical results on these esters are given in Table I.

TABLE I

| Ester | Analysis— Found C | Found H | Required C | Required H | Pour point, °C. | Viscosity, cs., at— 210° F. | 100° F. | ASTM slope |
|---|---|---|---|---|---|---|---|---|
| A | 75.25 | 6.1 | 75.55 | 6.15 | 0 | 15.4 | 274 | 0.778 |
| B |  |  |  |  | −17 | 9.1 | 97.3 | 0.774 |
| C | 75.6 | 6.25 | 75.8 | 6.4 |  | 90.2 |  |  |
| D | 76.2 | 7.0 | 76.5 | 6.9 | −18 | 18.0 | 269 | 0.715 |
| E | 76.55 | 7.45 | 77.1 | 7.45 |  | 22.1 | 274 | 0.646 |
| F | 73.9 | 5.0 | 74.35 | 5.2 |  | 20.6 |  |  |
| G | 74.25 | 5.4 | 74.7 | 5.4 | +5 | 17.6 | 724 | 0.904 |
| H | 73.9 | 5.1 | 74.3 | 5.2 | +13 | 15.7 | 932 |  |
| I |  |  |  |  | −14 | 15.0 | 264 | 0.781 |

The oxidation stability of Esters A, C, D, E, F, G and I and of certain other known esters noted for their good high temperature and oxidation stability properties were assessed in a laboratory oxidation rig which measured the time required to take up 0.5 mole of oxygen in 500 g. of the material being tested. Air was dispersed in the test samples at various temperatures by means of a sintered glass disc. In the case of the two known esters, tests were also carried out on them after they had been inhibited with 1% wt. phenyl - alpha - naphthylamine (PANA) and 1% wt. 5-ethyl-10:10-diphenylphenazasiline (5,10,10) a well-known antioxidant combination for lubricants intended for use at high temperatures. The results of the tests are given in the following table which shows the superior oxidation stability of certain esters according to the invention.

TABLE II

| Ester | Time to take up 0.5 mole oxygen in oxidation rig (hours) at— 200° C. | 230° C. | 260° C. |
|---|---|---|---|
| Ester A |  |  | 1.0 |
| Ester C |  | >2 |  |
| Ester D |  | 2.2 |  |
| Ester E |  | 1.2 |  |
| Ester F |  | >5.0 |  |
| Ester G |  | >5.0 |  |
| Ester I |  | 1.6 |  |
| Trimethylolpropane tricaprylate | 0.2 | 0.1 |  |
| Trimethylolpropane tricaprylate inhibited with PANA (1% weight) and 5,10,10 (1% weight) |  | 1.2 | 0.13 |
| Neopentylglycol dipelargonate | 0.14 |  |  |
| Neopentylglycol dipelargonate inhibited with PANA (1% weight) and 5,10,10 (1% weight) |  | 1.4 |  |

What is claimed is:

1. Aromatic esters which have the general formula:

wherein R is a member selected from the group consisting of hydrogen atoms and alkyl groups having 1–4 carbon atoms; $R_1$ is a saturated acyclic divalent hydrocarbon group having 2–14 carbon atoms; and $n$ is 0–1.

2. Esters according to claim 1 in which $R_1$ contains 7–14 carbon atoms.

3. Esters according to claim 2 in which $R_1$ is a polymethylene group.

4. Esters according to claim 1 in which $R_1$ is a dimethyl methylene group.

5. Aromatic esters which have the general formula:

wherein $R_1$ is a saturated acyclic divalent hydrocarbon group having 2–14 carbon atoms.

6. Esters according to claim 5, in which $R_1$ contains 7–14 carbon atoms.

7. Esters according to claim 6, in which $R_1$ is a polymethylene group.

8. Aromatic esters which have the general formula:

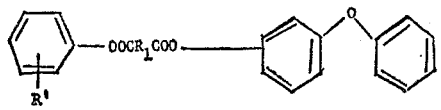

wherein $R_1$ is a saturated acyclic divalent hydrocarbon group having 2–14 carbon atoms, and R' is selected from the group consisting of hydrogen and tertiary butyl.

9. Esters according to claim 8, in which $R_1$ contains 7–14 carbon atoms.

10. Esters according to claim 9, in which $R_1$ is a polymethylene group.

References Cited
UNITED STATES PATENTS 2,099,455   11/1937   Strain _____ 260—479 S JAMES A. PATTEN, Primary Examiner U.S. Cl. X.R.

252—57